United States Patent [19]

Thévenot

[11] 4,348,048
[45] Sep. 7, 1982

[54] ADJUSTABLE CURVED SEAT FOR INFANTS

[75] Inventor: Gilles Thévenot, Baden-Baden, Fed. Rep. of Germany

[73] Assignee: Storchenmuhle Kinderausstattungs-GmbH & Co., Textile & Hartwarenwerk KG, Markleugast, Fed. Rep. of Germany

[21] Appl. No.: 158,094

[22] Filed: Jun. 10, 1980

Related U.S. Application Data

[63] Continuation-in-part of Ser. No. 916,662, Jun. 19, 1978.

[30] Foreign Application Priority Data

Jun. 21, 1977 [DE] Fed. Rep. of Germany ....... 2727785

[51] Int. Cl.³ ............................................. A47D 1/10
[52] U.S. Cl. .................................... 297/250; 297/329
[58] Field of Search ........ 297/250, 254, 253, 325–328, 297/329, 216

[56] References Cited

U.S. PATENT DOCUMENTS

| | | | |
|---|---|---|---|
| 2,151,729 | 3/1939 | Baker | 297/328 X |
| 3,370,885 | 2/1968 | Gale | 297/329 X |
| 3,645,548 | 2/1972 | Briner | 297/254 |
| 3,791,694 | 2/1974 | Roberts et al. | 297/250 |
| 3,948,556 | 4/1976 | Hyde et al. | 297/250 |
| 4,033,622 | 7/1977 | Boudreau | 297/250 |

FOREIGN PATENT DOCUMENTS 2016701 10/1971 Fed. Rep. of Germany ...... 297/216

Primary Examiner—Francis K. Zugel
Attorney, Agent, or Firm—Allison C. Collard; Thomas M. Galgano

[57] ABSTRACT

An adjustable boat-shaped seat for children, particularly usable as a car seat, includes a generally boat-shaped seat having armrests on each side thereof and generally arcuately-shaped slide guides integrally-molded to said seat on each side thereof adjacent to said armrests and a rigid frame upon which the seat rests. The frame includes two generally arcuately-shaped rails disposed generally parallel to the sides of the seat, each of which slidably rests upon and lies in front of, and above, one of the slide guides to permit movement of the seat between sitting and prone end positions.

7 Claims, 8 Drawing Figures

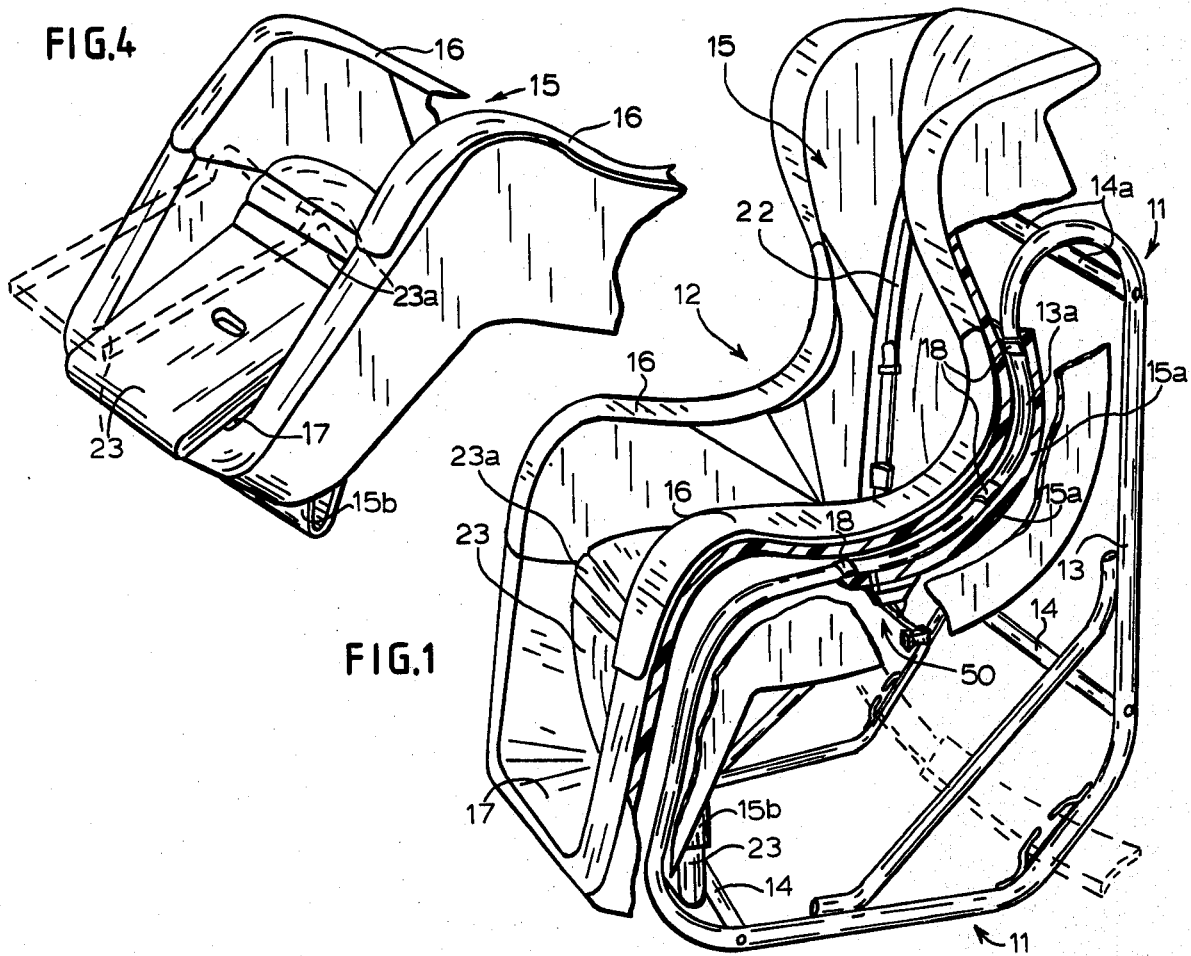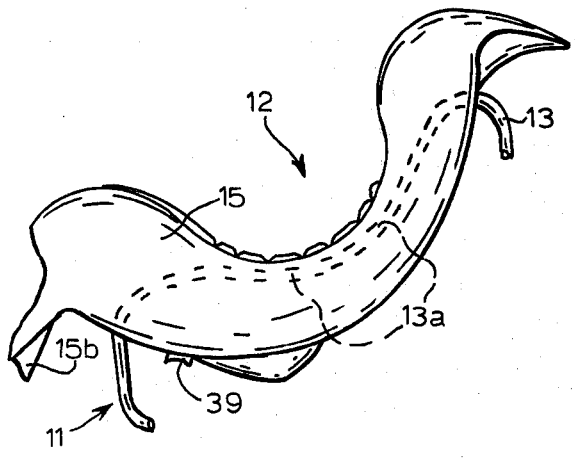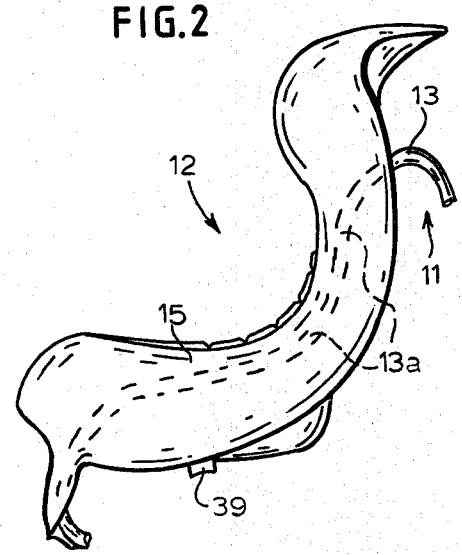

ADJUSTABLE CURVED SEAT FOR INFANTS

This is a continuation-in-part application of application Ser. No. 916,662 filed June 19, 1978.

This invention relates to an adjustable curved or boat-shaped seat with a safety belt for infants, especially useful as an infant's car seat.

Adjustable boat- or bowl-shaped seats of this kind are known, which may be brought to a sitting position and a reclining position, their position-changing mechanism consisting of numerous levers and linkages. The safety belt system, intended to protect the infant and prevent him from being thrown out of the car in case of accidents, is mounted on the normally boat- or shell-shaped seat with the aid of bolts, hooks, and eyelets. However, in the event of a collision, the load transmitted into these fixing elements of the safety belt may be so high that the belt elements may be torn out of their mountings or the latter may break free of the seat which is made of plastic.

In another known, adjustable infant seat, which is usually simply positioned on a rear seat of the car, the safety belt is fixed to the body of the car. Admittedly, the danger of a belt being torn out of their mountings is remote in this case, but another danger is created by the fact that, in the case of accidents, the whole weight of the seat has to be taken up by the safety belt and thus by the infant. In other words, the child receives impact loads both from the front and the rear. Apart from this dangerous load distribution, the numerous linkages which are required in order to change the positions of the seat, cannot withstand the high loads of sudden impacts, and are, therefore, either torn out, or they break apart. Finally, the removal of these safety belts, when taking the infant's seat out of the car, is a very time-consuming and laborious operation.

It is an object of the present invention to provide an infant's seat which is easily adjustable and which avoids or mitigates the above-noted disadvantages.

Another object of the present invention is to practically preclude the danger of the belt mountings tearing out of the seat or of the seat itself breaking off the fastenings of the underbody, even in the presence of considerable shock loads.

According to the present invention, these objects are achieved by the provision of an infant's seat of the aforementioned kind which is characterized by the provision of a generally boat-shaped seat having armrests on each side thereof and generally arcuately-shaped slide guides integrally-joined to the seat on each side thereof adjacent to the armrests and a rigid frame upon which the seat rests. The frame includes two generally arcuately-shaped rails disposed generally parallel to the sides of the seat, each of which slidably rests upon and lies in front of and above one of the slide guides to permit movement of the seat between sitting and prone end positions.

An embodiment of the present invention will now be described, by way of example only, reference being made to the accompanying drawings, where:

FIG. 1 is a perspective view of a novel boat-shaped seat for children embodying the present invention, with portions of its left armrest broken away to show internal construction;

FIG. 2 is a fragmentarily-illustrated, side elevational view of the seat illustrated FIG. 1, showing the same in its raised, sitting position;

FIG. 3 is a view comparable to that of FIG. 2 but showing the seat in its lowered, prone position;

FIG. 4 is a fragmentarily-illustrated, perspective view of the leg rest portion of the seat showing, in full line, the same withdrawn from its mounting receptacle and resting upon the foot rest and, in phantom line, an intermediate position of the same between its retracted and withdrawn positions;

Figure 7:
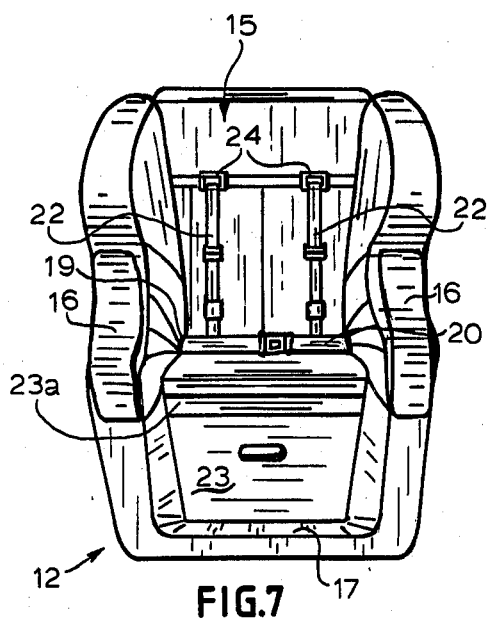
FIG. 7 is a front elevational view of the seat shown in FIG. 1.

Referring now in detail to the drawings and, in particular, FIGS. 1, 2, and 3, therein illustrated is an infant car seat embodying the present invention which is essentially composed of two parts which are adjustable relative to each other-namely, a tubular frame 11 which supports a seat 12 so that it may slide into different positions between at least a sitting position (FIGS. 1 and 2) and a prone or lying down position (FIG. 3). Frame 11 consists of two congruent and substantially parallel tubular frame sections 13, which are interconnected by a number of transverse braces or struts 14 to form a rigid, stable supporting frame. Seat 12 which is made of plastic (preferably reinforced by a layer of a textile material, glass-fibers or the like) basically consists of a boat-shaped body 15 having two armrests 16, a footrest 17 and a hinged legrest 23.

As can be seen from a comparison of FIGS. 1 and 4, legrest 23 is movable by means of a flexible hinge-area 23a between a retracted position in which it is accommodated behind footrest 17 within a recessed slotted member 15b formed in body 15 behind footrest 17, and a withdrawn position, in which the legrest is pulled upwardly and outwardly (shown in phantom line) so that it projects outwardly from and rests upon the front edge of footrest 17. As a result of these adjustment features, when the child is sitting up, the footrest 17 may be reached unhindered and, when in a reclining position, the infant's legs rest upon the extended legrest 23, so that the infant's legs are relaxed while the child is sleeping.

Figure 8:
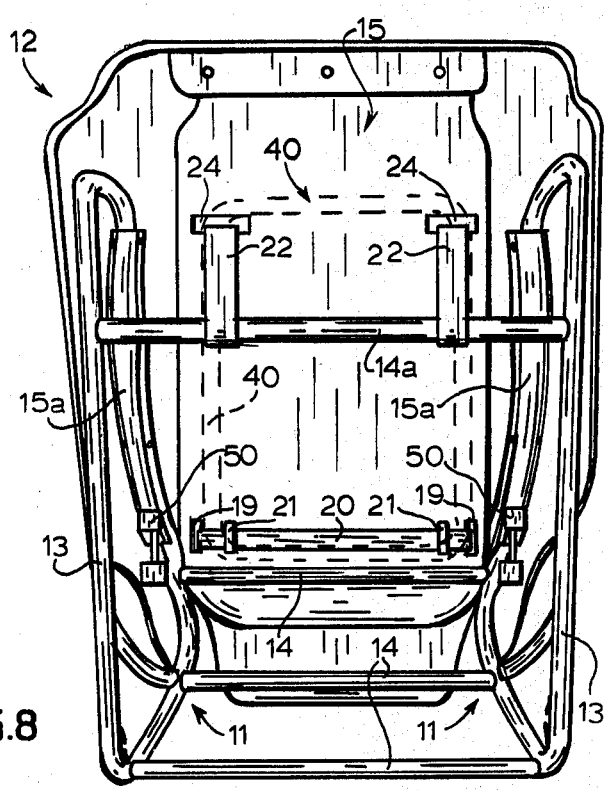
FIG. 8 is an enlarged, rear elevational view of the seat, also showing an alternate belt support system in phantom line.

Referring now back to FIG. 1 as well as FIG. 8, the upper portions 13a of tubular frame sections 13 are arcuately-shaped, thus forming a generally parallel running double slide rail along which the seat may slide for positioned adjustment. The main feature of this arrangement is that the two arcuate upper portions 13a of tubular frame sections 13 are each located in front of, and above, a complementarily-channeled guide element 15a (see FIGS. 5 and 6), which guide elements 15a are integrally-joined to body 15 in the area of armrests 16 after the body 15 has been placed over the frame 11; in the illustrated embodiment, they are in fact located immediately behind armrests 16.

To facilitate slidable mounting of body 15, on slide rails 13a of frame sections 13, several collars or clips 18 are provided which are fastened to body 15 straddling channel-shaped guide elements 15a and the slide rails slidably received therein. Apart from this, these tube clips 18 provide end stops for the seat in its extreme positions. As will be noted, there are no fixed connecting points between seat 12 and supporting frame 11. Seat 12 is freely slidable relative to frame 11, its guide elements 15a being in sliding contact with the arcuate portions 13a of tubular frame section 13. The significant feature is that guide elements 15a which are integral with boat-shaped body 15, embrace frame portions 13a from behind, so that in the event of an impact caused by a collision, the seat is forced from behind against the tubular frame (in the direction of the arrows in FIG. 6). Frame sections 13 will consequently absorb the impact directed against boat-shaped body 15 irrespectively of whether tube clips 18 are used in order to slidably guide and connect seat 15 with frame 11. Since neither bolts nor linkages are used with this new design, it is literally impossible that these parts could be torn off as the result of an accident.

A safety belt system is provided to prevent the child from being thrown from the seat in the case of an accident. There is a seat or lap belt 20 which is intended to extend around the infant's waist or pelvis area. As shown in FIG. 8, belt 20 extends across the rear surface of body 15 and it extends through two spaced-apart slotted guide supports 21 and then through two slits or apertures 19 to the front of the body, where the ends thereof would be fastened around the infant's waist by means of a conventional buckle assembly. In cooperation therewith, two shoulder straps or belts 22 are provided each of which extend through a slot or aperture 24 formed in body 15 at about should height. The rear end of belts 22 are securely fastened to an upper strut 14a of frame 11 and the front ends of belts 22 are securely fastened or sewn to the front end of lap belt 20, as shown in FIG. 7. The upper strut 14a to which the shoulder straps 22 are fastened is positioned relative to the two end positions of seat body 15, such that the belt ends may be fastened thereto without hindering or in any way changing the desired belt tension in either of the two seating positions, due to the arcuate sliding path of the seat. This is accomplished by positioning the upper strut 14a such that it is equidistantly spaced from slots 24 in either of the two seating positions. As a result thereof, the length of the rear portions of the shoulder belt extending between the point of attachment to the upper strut 14a and the slots 24 does not change in the two end positions, as a result of which the belt tension remains the same.

Alternatively, a generally rectangular pipe frame 40 (shown in phantom line in FIG. 8) may be affixed to the rear side of the body 15, which frame is configured to compliment the contour of the rear surface of body 15. In this case, the rear ends of the safety belts 20 and 22 which extend through apertures 19 and 24, respectively, would be securely fastened to this frame. With this arrangement, the tensile load applied to the safety belts during a collision is transmitted into the entire back surface of boat-shaped seat body 15 through tubular frame 40 and there is, therefore, no danger of individual fastening elements breaking loose. In addition to this, the belts in this case will accommodate a variety of seating positions without having to be readjusted.

Figure 5:
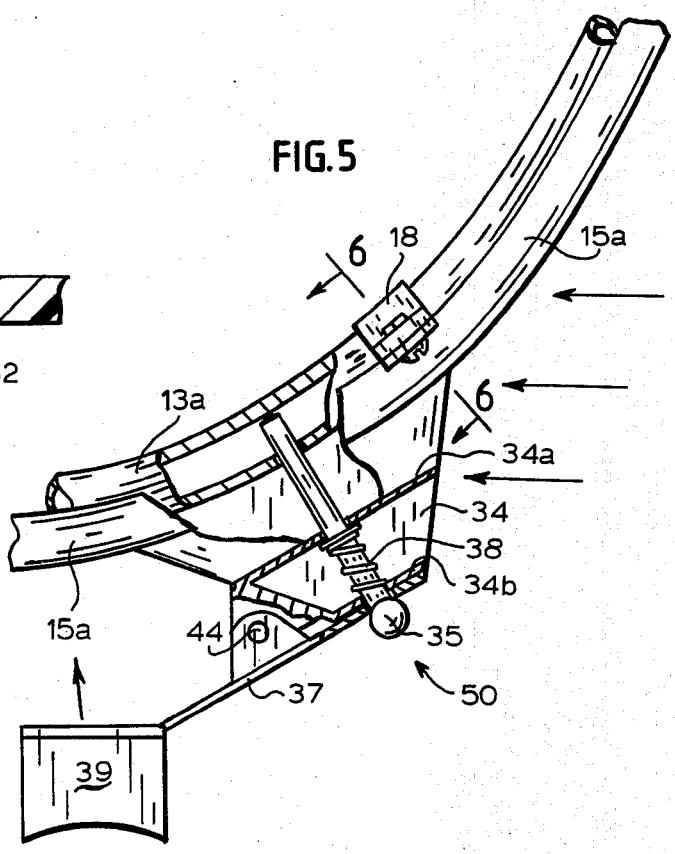
FIG. 5 is an enlarged, fragmentarily-illustrated side elevational view of a portion of the seat slide guide supporting the associated frame rail in the area of the seat position arresting mechanism, with portions broken away to show internal construction.

FIG. 5 is a longitudinal sectional view through the region of the slideways. Tubular bar 13a is in sliding surface contact with the channel of guide element 15a which again is of arcuate cross-section so that seat 12, when changing from the sitting to the reclining position, slides over a circular arc.

Figure 6:
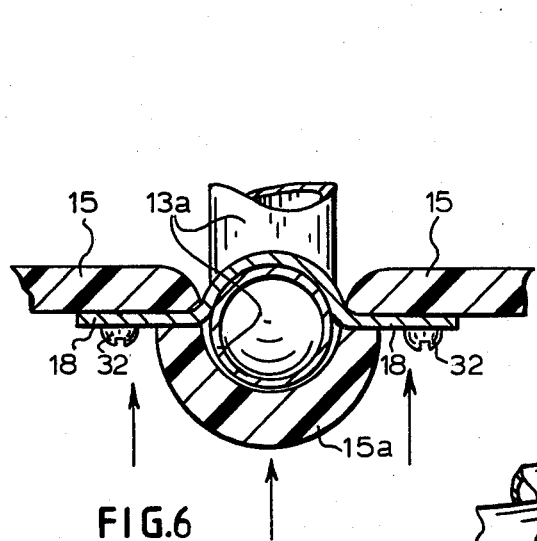
FIG. 6 is a further enlarged, sectional view taken along line 6—6 of FIG. 5.

As shown in greater detail in FIG. 6 the contour of the channeled guide elements 15a, which are an integral part of boat-shaped body 15 provided on each side thereof, complements the cross-section of tubular bars 13a and, with the aid of tube clips 18 and screws 32, seat 12 is loosely and slidably connected with frame 11 (the arrows indicate the direction in which the force of the load is directed into the seat in the event of a collision). As a result of this arrangement, guide elements 15a would be pressed against bars 13a without applying any stress on screws 32 of tube clips 18.

As seen best in FIG. 5, an arresting spring mechanism 50 is provided which locks the seat in any desired position relative to the frame. A right angle, U-shaped plate 34 having a parallel upper and lower arms or extension lugs 34a, 34b is fastened by screws to the underside of guide elements 15a, with its upper arm 34a lying flush against a planar mounting surface of guide element 15a. Arms 34a and 34b are provided with aligned bores for accommodating a T-shaped locking bolt 35 which is displaceable against the force of a spring 38. For cooperation therewith, tubular bars 13a are provided with corresponding bores spaced according to the desired sitting or resting positions, in which the locking bolt 35 may engage to lock the chair in the chosen position. An arresting lever 37 is mounted on plate 34 by means of a pivot pin 44 and it has a slotted end through which the T-shaped bolt 35 extends. The other end of arresting lever 37 is provided with a finger or hand-grip 39. When this hand grip 39 is moved in the direction of the arrow, bolt 35 is pulled out of the bore in the bars 13a and the seat may consequently be swivelled into any other desired position.

Thus, the embodiment described provides an adjustable car seat for infants, which incorporates a reliable safety belt and avoids the drawbacks discussed above. It is easily adjusted without using any articulated parts, and is designed in such a manner that the belt fastening elements on the boat-shaped seat cannot possibly be torn out. Nor is it possible for the seat body to break loose at the connecting points between the seat and the supporting frame, even in the event of considerable impact forces created during a collision.

While only one embodiment of the present invention was shown and described, it will be obvious to those persons of ordinary skill in the art that many changes and modifications may be made thereunto without departing from the spirit and scope of the invention.

What is claimed is:

1. An adjustable boat-shaped seat for infants, particularly for use as a car seat, comprising:
   a generally boat-shaped seat having armrests on each side thereof and a generally arcuately-shaped slide guide having a generally U-shaped channel, integrally-joined to the underside of said seat on each side thereof adjacent to each of said armrests thereof; and
   a rigid frame supporting said seat, said frame including two generally arcuately-shaped rails disposed generally parallel to the sides of said seat, each of which slidably supports said seat and lies in front of, and above, one of said slide guides within said channel thereof to permit movement of said seat between sitting and prone end positions, said frame being made from tubular metal and including two congruent, generally parallel pipe frames, to each of which one of said rails is connected and at least two transverse connecting struts which rigidly connect said two pipe frames together; and means for arresting said seat on said frame in at least said sitting and prone end positions.

2. The seat according to claim 1, additionally including a substantially rectangular tubular frame disposed on the rear side of said seat, said frame being configured to complement the curvature of the rear side of said seat and closely abutting said rear side, a seat belt and a shoulder belt and wherein said seat has a lower and upper pair of spaced-apart apertures formed therethrough provided in an area of the seat corresponding to the position of the pelvis and shoulders of the child sitting is said seat, respectively, through which said seat belt and said shoulder belt extend, respectively, and wherein said belts each have rear ends which are rigidly connected to said rectangular tubular frame.

3. The seat according to claim 1, additionally including a seat belt and a shoulder belt, wherein said seat has an upper and lower pair of spaced-apart apertures formed therethrough, each of said pairs of apertures being provided in an area of the seat, corresponding to the position of the pelvis and shoulders of a child sitting in said seat, respectively, through which said belts extend, respectively, and wherein said shoulder belt has two rear ends which are rigidly connected to said one of said connecting struts, and wherein the spatial position of said one connecting strut is chosen in such a manner that is equidistantly-spaced from said apertures through which said shoulder belt extends in either position of said seat, so that said shoulder belt occupies in both end positions of said seat the identical fit for the child who sits upon the seat.

4. The seat according to claim 1, wherein said seat is fabricated from plastic.

5. The seat according to claim 1, additionally including a plurality of collars for loosely and slidably holding said seat on said rails of said frame.

6. The seat according to claim 1, wherein said arresting means includes a spring-loaded stop-bolt arranged underneath at least one of said armrests.

7. The seat according to claim 1, wherein a footrest is formed at the lower end of the seat and an adjustable legrest cushion is hingeably secured to said seat above said footrest so that it may be adjusted for said sitting position with its lower edge disposed behind said footrest and may be adjusted for said prone position with its lower edge in front of said footrest.

* * * * *